United States Patent
Yang

(10) Patent No.: US 10,120,504 B2
(45) Date of Patent: Nov. 6, 2018

(54) PIXEL DRIVING CIRCUIT AND ITS DRIVING METHOD, ARRAY SUBSTRATE, TRANSFLECTIVE DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Shengji Yang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 9 days.

(21) Appl. No.: 14/770,005

(22) PCT Filed: Dec. 17, 2014

(86) PCT No.: PCT/CN2014/094020
§ 371 (c)(1),
(2) Date: Aug. 24, 2015

(87) PCT Pub. No.: WO2016/011769
PCT Pub. Date: Jan. 28, 2016

(65) Prior Publication Data
US 2016/0252992 A1    Sep. 1, 2016

(30) Foreign Application Priority Data
Jul. 24, 2014   (CN) .......................... 2014 1 0357298

(51) Int. Cl.
*G06F 3/042* (2006.01)
*G09G 3/20* (2006.01)
(Continued)

(52) U.S. Cl.
CPC .......... *G06F 3/042* (2013.01); *G02F 1/13318* (2013.01); *G06F 3/0412* (2013.01);
(Continued)

(58) Field of Classification Search
CPC ......... G02F 2201/121; G02F 1/133555; G02F 1/136213; G02F 2001/136231;
(Continued)

(56) References Cited

U.S. PATENT DOCUMENTS 8,659,576 B2    2/2014 Kang et al.
9,261,726 B2    2/2016 Shi et al.
(Continued)

FOREIGN PATENT DOCUMENTS

CN        101140738 A    3/2008
CN        101726897 A    6/2010
(Continued)

OTHER PUBLICATIONS

Second Chinese Office Action in Chinese Application No. 201410357298.1, dated Sep. 8, 2016 with English translation.
(Continued)

*Primary Examiner* — Sanjiv D Patel
(74) *Attorney, Agent, or Firm* — Collard & Roe, P.C.

(57) ABSTRACT

There is disclosed a pixel driving circuit and its driving method, an array substrate, a transflective display apparatus. At least one of the pixels of the pixel driving circuit includes a light touch module (10) which comprises: a photosensitive unit (101) which senses the light intensity and produces an electrical signal carrying the light intensity information; a signal reading unit (102) connected with the photosensitive unit and reading the electrical signal from there; an amplifier (103) connected with the signal reading unit (102) and amplifying the electrical signal acquired therefrom; and a processor (104) connected with the amplifier (103), having (Continued)

a threshold of the change of the electrical signal and the electrical signal amplified at a previous time stored therein, and taking the acquired position information of the pixel where the light touch module (10) is located as the touch position when the change amount of the electrical signal amplified at a current time relative to the electrical signal amplified at the previous time acquired from the amplifier (103) is greater than the threshold. The driving circuit and the driving method provided in the present disclosure cause the array substrate and the transflective display apparatus applying the both to realize the light touch function on the basis of realizing the display function.

18 Claims, 4 Drawing Sheets

(51) Int. Cl.
*G06F 3/041* (2006.01)
*G09G 3/36* (2006.01)
*G02F 1/133* (2006.01)
*G02F 1/1333* (2006.01)
*G02F 1/1362* (2006.01)

(52) U.S. Cl.
CPC ......... *G06F 3/0421* (2013.01); *G09G 3/2092* (2013.01); *G09G 3/3648* (2013.01); *G02F 1/13338* (2013.01); *G02F 1/13624* (2013.01); *G02F 1/136286* (2013.01); *G02F 2001/13312* (2013.01); *G02F 2001/13324* (2013.01); *G09G 2300/0456* (2013.01); *G09G 2330/12* (2013.01); *G09G 2360/144* (2013.01)

(58) Field of Classification Search
CPC ...... G02F 1/13338; G02F 2001/13312; G09G 2300/0456; G09G 3/3655; G09G 2300/0426; H01L 27/3227; G06F 3/0412; G06F 3/042; G06F 3/0421; G06F 2203/04109; G06F 3/0416
See application file for complete search history.

(56) References Cited

U.S. PATENT DOCUMENTS

| | | | |
|---|---|---|---|
| 2003/0156087 A1 | 8/2003 | Boer et al. | |
| 2004/0113877 A1* | 6/2004 | Abileah | G06F 3/0412 345/92 |
| 2006/0138983 A1 | 6/2006 | Lee et al. | |
| 2006/0187367 A1* | 8/2006 | Abileah | G06F 3/0412 349/37 |
| 2007/0063990 A1* | 3/2007 | Park | G06F 3/044 345/173 |
| 2007/0063991 A1* | 3/2007 | Lee | G06F 1/3203 345/173 |
| 2007/0109239 A1* | 5/2007 | den Boer | G02F 1/13338 345/87 |
| 2007/0153141 A1* | 7/2007 | Tsai | G02F 1/133555 349/38 |
| 2008/0055262 A1 | 3/2008 | Wu et al. | |
| 2008/0062156 A1 | 3/2008 | Abileah et al. | |
| 2008/0123000 A1* | 5/2008 | Lin | G02F 1/133555 349/33 |
| 2008/0278645 A1* | 11/2008 | Park | G02F 1/133371 349/38 |
| 2010/0103130 A1 | 4/2010 | Kang et al. | |
| 2011/0037931 A1* | 2/2011 | Im | G02F 1/133512 349/113 |
| 2011/0156996 A1 | 6/2011 | Izumi | |
| 2014/0125632 A1 | 5/2014 | Chen et al. | |
| 2015/0029421 A1 | 1/2015 | Gu et al. | |

FOREIGN PATENT DOCUMENTS

| | | |
|---|---|---|
| CN | 101776813 A | 7/2010 |
| CN | 103135861 A | 6/2013 |
| CN | 103176676 A | 6/2013 |
| CN | 103324362 A | 9/2013 |
| CN | 203178628 U | 9/2013 |
| CN | 103576354 A | 2/2014 |
| CN | 103680385 A | 3/2014 |
| CN | 103927988 A | 7/2014 |
| CN | 104200784 A | 12/2014 |
| EP | 2 287 657 A1 | 2/2011 |
| JP | 4915477 B2 | 4/2012 |
| TW | 201419090 A | 5/2014 |

OTHER PUBLICATIONS

International Search Report of PCT/CN2014/094020 in Chinese, dated May 6, 2015 with English translation.
Notice of Transmittal of the International Search Report of PCT/CN2014/094020 in Chinese, dated May 6, 2015.
Written Opinion of the International Searching Authority of PCT/CN2014/094020 in Chinese, dated May 6, 2015 with English translation.
Chinese Office Action in Chinese Application No. 201410357298.1, dated Feb. 1, 2016 with English translation.
Extended European Search Report in EP 14883528.3 dated Feb. 8, 2018.

* cited by examiner

PIXEL DRIVING CIRCUIT AND ITS DRIVING METHOD, ARRAY SUBSTRATE, TRANSFLECTIVE DISPLAY APPARATUS

CROSS REFERENCE TO RELATED APPLICATIONS

This application is the National Stage of PCT/CN2014/094020 filed on Dec. 17, 2014, which claims priority under 35 U.S.C. § 119 of Chinese Application No. 201410357298.1 filed on Jul. 24, 2014, the disclosure of which is incorporated by reference.

TECHNICAL FIELD

The present disclosure relates to a pixel driving circuit and its driving method, an array substrate, a transflective display apparatus.

BACKGROUND

In the known field of flat panel display technology, the liquid crystal display apparatus dominates due to its advantages of small size, low power consumption, no radiation and so on. The liquid crystal display apparatus may be classified into three types of transmissive, reflective and transflective depending on different types of light sources (internal light source, external light source) used.

Each pixel unit of a transflective liquid crystal display apparatus usually includes two parts, i.e. a transmissive region and a reflective region in which a reflection structure for reflecting the light is provided. The light emitted by a back light source may be emitted out through the transmissive region, and after entering inside of the liquid crystal display apparatus, the ambient light may be reflected out of the screen by the reflection structure located in the reflective region, thus making a user clearly see the content displayed on the screen.

When displaying a picture, the transflective liquid crystal display apparatus may use not only the light of the internal back light source but also the external ambient light, and thus is able to meet the usage requirements in cases of the ambient light being sufficient (e.g. outdoor) and insufficient (e.g. indoor) and so on, having both the advantage of the picture visibility being good for a transmissive display apparatus and the advantage of the energy consumption being low for a reflective display apparatus.

With the unceasing progress of the display technology, the diversity requirement on functions of a display apparatus by people is increasingly high. A display apparatus with a touch function realizes more convenient and more efficient human-machine interaction and is widely applied in all walks of life. Thus, how to realize the touch function of a transflective display apparatus becomes one of directions of research in the field presently.

SUMMARY OF THE DISCLOSURE

One embodiment of the present disclosure provides a pixel driving circuit, comprising: a plurality of pixels arranged in a matrix; gate lines located between two adjacent rows of the pixels, at least one of the pixels comprising a light touch module which comprises: a photosensitive unit which senses the light intensity and produces an electrical signal carrying the light intensity information; a signal reading unit connected with the photosensitive unit, the signal reading unit being controlled by the gate lines, being turned on under the driving of the gate lines, and reading the electrical signal from the photosensitive unit; an amplifier connected with the signal reading unit, the amplifier acquiring the electrical signal from the signal reading unit and amplifying the electrical signal; a processor connected with the amplifier, the processor being configured to acquire the electrical signal amplified at the current time from the amplifier, obtain the change amount of the electrical signal amplified at the current time relative to the electrical signal amplified at a previous time, compare the change amount with a threshold of the change of the electrical signal, acquire the position information of the pixel where the light touch module is located when the change amount is greater than the threshold of the electrical signal change, and take the position information as the touch position, the threshold of the change of the electrical signal and the electrical signal amplified at the previous time being stored in the processor.

Alternatively, the pixel driving circuit further comprises a common electrode line by which the photosensitive unit is controlled.

Alternatively, the photosensitive unit comprises: a first thin film transistor, the gate of which is connected with the common electrode line, the source of which is connected with the common electrode line, and the drain of which is connected with the signal reading unit; a first storage capacitor, the first end of which is connected with the source of the first thin film transistor, and the second end of which is connected with the drain of the thin film transistor.

Alternatively, the pixel driving circuit further comprises a signal reading line through which the signal reading unit is connected with the amplifier.

Alternatively, the pixel driving circuit comprises data lines located between two adjacent columns of the pixels, the data lines and the signal reading line being arranged in parallel, or at least one of the data lines functioning as the signal reading line.

Alternatively, when at least one of the data lines functions as the signal reading line, the pixel driving circuit further comprise a switch located between the signal reading unit and the amplifier, the switch being configured to be turned on only when the light touch module is working.

Alternatively, the signal reading unit comprises a second thin film transistor, the gate of which is connected with the gate lines, the source of which is connected with the photosensitive unit, and the drain of which is connected with the signal reading line.

Alternatively, the numbers of the gate lines are a first gate line, a second gate line, . . . , a M-th gate line in order, the pixel driving circuit comprises data lines located between two adjacent columns of the pixels, the numbers of the data lines are a first data line, a second data line, . . . , a N-th data line in order, and the position information of the pixel where the light touch module is located includes the numbers of the gate line and the data line which are connected with the pixel where the light touch module is located.

Alternatively, pixels including the light touch module are distributed evenly or unevenly in the pixel driving circuit.

Another embodiment of the present disclosure also provides a driving method for a pixel driving circuit, for driving the above pixel driving circuit, the driving method comprising a display driving procedure and a light touch driving procedure, wherein the light touch driving procedure comprises: sensing the light intensity and producing an electrical signal carrying the light intensity information; reading the electrical signal; acquiring the electrical signal and amplifying the electrical signal; acquiring the electrical signal amplified at a current time, obtaining the change amount of the electrical signal amplified at the current time relative to the electrical signal amplified at a previous time, comparing the change amount with a threshold of the change of the electrical signal, acquiring the position information of the pixel where the light touch module obtaining the change amount is located when the change amount is greater than the threshold of the change of the electrical signal, and taking the position information as the touch position.

Alternatively, when the data lines and the signal reading line are arranged in parallel, the display driving procedure and the light touch driving procedure are performed simultaneously within the time of one frame.

Alternatively, when at least one of the data lines functions as the signal reading line, within the time of one frame, the light touch driving procedure is performed after the display driving procedure is completed, or the display driving procedure is performed after the light touch driving procedure is completed.

A further embodiment of the present disclosure also provides an array substrate comprising the pixel driving circuit as described above, each pixel of the pixel driving circuit comprising a transmissive region, and a reflective region in which a reflection structure for reflecting the light is provided.

Alternatively, the pixel driving circuit further comprises a common electrode line with which the reflection structure is connected; the pixel comprising the light touch module of the pixel driving circuit comprises a first thin film transistor and a first storage capacitor with the reflection structure being a first plate of the first storage capacitor; the pixel comprising the light touch module of the pixel driving circuit further comprises a storage electrode which has an overlapping part with the reflection structure, is connected with the drain of the first thin film transistor and is a second plate of the first storage capacitor.

Alternatively, the storage electrode is located above the reflection structure.

Alternatively, the pixel is a red pixel, a green pixel or a blue pixel, and the pixel comprising the light touch module of the pixel driving circuit is a blue pixel.

Another embodiment of the present disclosure provides a transflective display apparatus comprising the array substrate as described above.

In the pixel driving circuit and its driving method, the array substrate, the transflective display apparatus provided by embodiments of the present disclosure, by providing the light touch module which comprises a photosensitive unit, a signal reading unit, an amplifier and a processor in at least one pixel on the existing pixel driving circuit, upon driving, the photosensitive unit is used to sense the light intensity and produce the electrical signal carrying the light intensity information, the signal reading unit is used to read the electrical signal, the amplifier is used to amplify the electrical signal, the processor is used to acquire the change amount of the electrical signal amplified at the current time relative to the electrical signal amplified at the previous time, and decide whether the change amount is beyond a threshold of the change of the electrical signal. If the answer is "yes", it is indicated that there is a touch action, and the position information of the pixel where the light touch module obtaining the change amount is acquired as the touch position. The driving circuit and the driving method as described above can enable the array substrate and the transflective display apparatus applying the both to realize the light touch function on the basis of realizing the display function.

DETAILED DESCRIPTION

In the following, technical schemes in embodiments of the present disclosure will be described clearly and completely in conjunction with attached drawings in embodiments of the present disclosure. Apparently, the described embodiments are only a part of embodiments of the present disclosure, but not all of embodiments. Based on embodiments in the present disclosure, all of other embodiments obtained by those ordinary skills in the art without any creative work belong to the protection scope of the present disclosure.

First Embodiment

Figure 1:
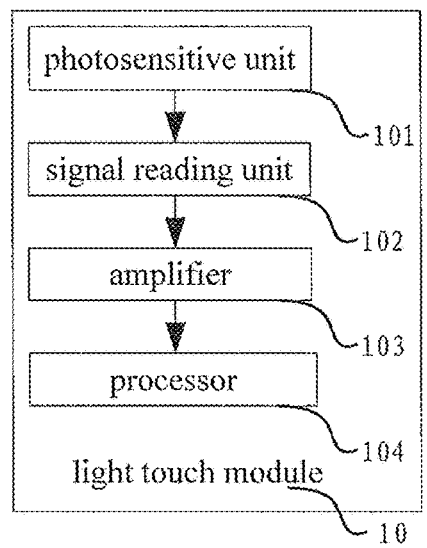
FIG. 1 is a schematic diagram of the structure of a light touch module provided by a first embodiment of the present disclosure.

The present embodiment provides a pixel driving circuit, including multiple pixels arranged in a matrix and gate lines located between two adjacent rows of pixels. As shown in FIG. 1, at least one pixel of the pixel driving circuit includes a light touch circuit 10. The light touch circuit 10 includes: a photosensitive unit 101 for sensing the light intensity and producing an electrical signal carrying the light intensity information; a signal reading unit 102 connected with the photosensitive unit 101, the signal reading unit 102 being controlled by the gate lines, being turned on under the driving of the gate lines, and reading the electrical signal from the photosensitive unit 101; an amplifier 103 connected with the signal reading unit 102, the amplifier 103 acquiring the electrical signal from the signal reading unit 102 and amplifying the electrical signal; a processor 104 connected with the amplifier 103, the processor 104 being configured to acquire the electrical signal amplified at the current time from the amplifier 103, obtain the change amount of the electrical signal amplified at the current time relative to the electrical signal amplified at a previous time, compare the change amount with a threshold of the change of the electrical signal, acquire the position information of the pixel where the light touch module 10 is located when the change amount is greater than the threshold of the electrical signal change, and take the position information as the touch position, the threshold of the change of the electrical signal and the electrical signal amplified at the previous time being stored in the processor 104.

In the above pixel driving circuit, on the basis of the existing pixel driving circuit, by providing in at least one pixel a light touch module, which is able to perform a light touch scan on the display apparatus under the driving of the gate lines and to decide the touch position, the touch function is realized moreover on the basis of realization of the display function.

Figure 2:
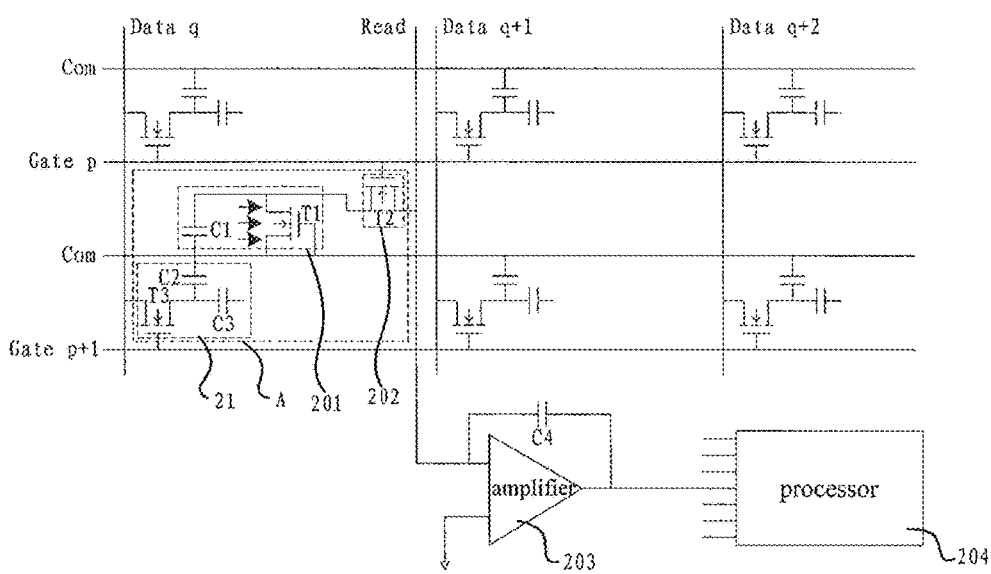
FIG. 2 is a circuit diagram of the light touch module provided by the first embodiment of the present disclosure.

In the following, the structure of the pixel driving circuit provided by the present embodiment is introduced in conjunction with a circuit diagram. As shown in FIG. 2, the pixel driving circuit includes multiple pixels arranged in an array. There is a gate line (i.e. Gate line) between every two adjacent rows of pixels, thus there is a row of pixels between the p-th gate line (i.e. Gate p) and the (p+1)-th gate line (i.e. Gate p+1) adjacent to each other. At least one pixel A of the multiple pixels includes a light touch module which includes a photosensitive unit 201, a signal reading unit 202, an amplifier 203 and a processor 204.

The circuit may further include a common electrode line (i.e. Com line) for applying a common electrode signal to the photosensitive unit 201 to turn on the photosensitive unit 201. The Com line is exemplarily located between two adjacent gate lines and is arranged in parallel with the gate lines.

The photosensitive unit 201 may exemplarily include: a first thin film transistor T1, the gate of which is connected with the common electrode line, the source of which is connected with the common electrode line, and the drain of which is connected with the signal reading unit 202; a first storage capacitor C1, the first end of which is connected with the source of the first thin film transistor T1 and the second end of which is connected with the drain of the thin film transistor.

The photosensitive unit 201 is controlled by the Com line. By applying the common electrode signal to the Com line, it is possible to turn on the first thin film transistor T1 which is a photosensitive thin film transistor and under the irradiation of the ambient light. After being turned on, the first thin film transistor T1 produces a photocurrent (i.e. an electrical signal carrying the light intensity information) according to the intensity of the irradiation, charges the first storage capacitor C1 so as to store the electrical signal carrying the light intensity information in the storage capacitor C1.

The above circuit may exemplarily further include a signal reading line (i.e. Read line), and the signal reading unit 201 may be connected to the amplifier 203 via the Read line. The pixel driving circuit in the present embodiment includes data lines (i.e. Data lines) located between two adjacent columns of pixels. The Data lines may be arranged in parallel with the Read line, alternatively, at least one of Data lines functions as the Read line and the rest of Data lines are the (q+1)-th data line (i.e. Data q+1) adjacent to the pixel A including the light touch module.

It is noted that, making the Data lines be able to be arranged in parallel with the Read line may implement utilizing the Read line to read the electrical signal carrying the light intensity information read by the signal reading unit 202 so as to realize the light touch while utilizing the Data lines to apply data signals to pixels so as to perform displaying of picture. Thereby, the picture display function and the light touch function may be performed in the same time and do not interfere with each other, and thus the driving method realizing the two functions is simpler.

Figure 3:
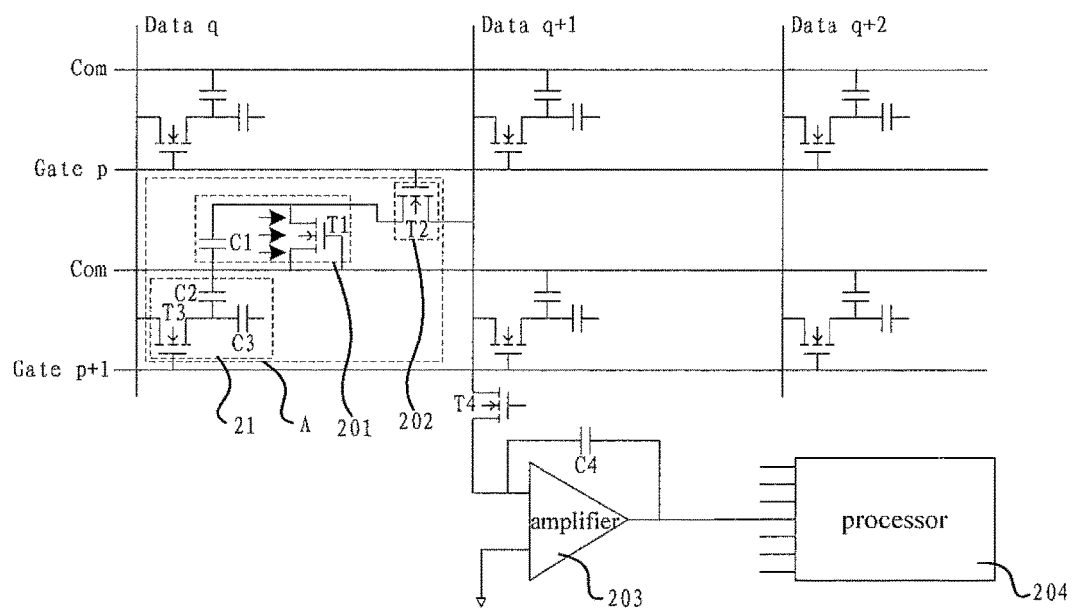
FIG. 3 is another circuit diagram of the light touch module provided by the first embodiment of the present disclosure.

In addition, taking at least one of Data lines as the Read line is, in fact, performing the time division reusing of the Data line in the procedure of driving the picture display and the light touch. That is, the signal required for the picture display is input to the Data line when it is required to drive the picture display, and the electrical signal carrying the light intensity information read by the signal reading unit 202 is transmitted to the amplifier 201 by using the Data line, as shown in FIG. 3, when it is required to drive the light touch. In this case, the pixel driving circuit in the present embodiment may exemplarily further include a switch T4, located between the signal reading unit 202 and the amplifier 203, the switch T4 being turned on only when the light touch module is working, so as to prevent the signals applied on the Data lines from being transmitted to the amplifier 203 when the picture display is being driven. Exemplarily, the switch T4 may be a thin film transistor so as to be compatible with the process of remaining thin film transistors in the pixel driving circuit, thus the production process is simplified. The switch T4 may be controlled by a pulse width modulation signal, the pulse width of which is the time required for performing the scan of the Gate p. Exemplarily, the switch T4 may also be integrated with the amplifier 203 and the processor 204 to be located on the peripheral circuit chip of the array substrate, so as to avoid occupying the space of the array substrate, which benefits reducing the width of the frame.

In the present embodiment, the signal reading unit 202 may exemplarily include a second thin film transistor T2, the gate of which is connected with the Gate p, the source of which is connected with the photosensitive unit 201, and the drain of which is connected with the signal reading line, i.e. the Read line.

When the Gate p is scanned, the second thin film transistor T2 is turned on, so that the first storage capacitor C1 is discharged, and transmits the stored electrical signal carrying the light intensity information to the amplifier 203 through the Read line.

The amplifier 203 includes an input end, an output end and a common end, the input end being connected with the Read line, the output end being connected with the processor 204 and the common end being grounded. In the present embodiment, alternatively, a fourth storage capacitor C4 may be connected in parallel between the input end and the output end of the amplifier 203, the fourth storage capacitor being used for filtering the signal passed through the amplifier 203.

After the electrical signal transmitted from the signal reading unit 202 by the Read line is received by the amplifier 203, the amplifier 203 amplifies the electrical signal in order to facilitate the subsequent computation and processing of the signal. The amplified electrical signal still carries the light intensity information, that is, is able to characterize the light intensity.

After acquiring and storing the electrical signal amplified by the amplifier, the processor 204 subtracts the electrical signal from the electrical signal amplified by the amplifier when the Gate p is scanned at a previous time to obtain the change amount of the electrical signal at the current time relative to the electrical signal at the previous time.

Since the electrical signal is able to characterize the light intensity, if the change amount of the electrical signal is greater than a threshold of the change of the electrical signal, it means that the light intensity changes largely for the time period from the previous time to the current time. It also means that the light irradiated on the first thin film transistor T1 during this time period is shielded and that a touch action occurs. Thereby, the processor will analyze and obtain the position of the pixel A where the light touch module, where the photosensitive unit 201 is located transmitting the electrical signal changing largely as compared with the previous time, is located, the position of the pixel A being the position where the touch occurs. If the change amount of the electrical signal is less than or equal to the threshold of the change of the electrical signal, it means that the light intensity does not change largely for the time period from the previous time to the current time, that is, the light irradiated on the first thin film transistor T1 is not shielded and there is no touch action occurred.

It is noted that, in the present embodiment, assuming that the numbers of Gate lines are a first gate line, a second gate line, . . . , a M-th gate line in order and that the numbers of Data lines are a first data line, a second data line, . . . , a N-th data line in order, the position information of the pixel A where the light touch module is located includes the numbers of the gate line and the data line which are connected with the pixel A where the light touch module is located. In the driving circuits shown in FIGS. 2 and 3, the coordinates of the touch positions may exemplarily be [p, q] where $p \leq M$, $q \leq N$.

The number and the distribution of pixels including the light touch module in the pixel driving circuit are not limited by the present embodiment, but may be adjusted accordingly depending on different requirements on the touch accuracy and the touch region. For example, if the touch accuracy is required to be high, more pixels including the light touch module may be provided; if the touch accuracy is not required to be very high, the number of pixels including the light touch module may be reduced; and if the requirement on the touch accuracy at each position of the display apparatus is consistent or essentially consistent, pixels including the light touch module may be distributed evenly in the pixel driving circuit, and the degree of the density of the distribution thereof may further be determined in combination with the requirement on the touch accuracy, for example, two adjacent rows of pixels including the light touch module may be spaced out by two rows of ordinary pixels (i.e. pixels not including the light touch module), and two adjacent columns of pixels including the light touch module may be spaced out by two columns of ordinary pixels, and so on. In a general case, the number of touches on the center region of the display apparatus is more than that on the edge region thereof, thus exemplarily, it is possible to make the number of pixels including the light touch module included in the center region more than that in the edge region, the density of the distribution of the pixels included in the center region greater than that in the edge region, and so on.

In the present embodiment, each pixel further includes a display driving module for driving the pixel to display an image. The display driving module may exemplarily include a third thin film transistor T3, a second storage capacitor C2 and a third storage capacitor C3. The gate of the third thin film transistor T3 is connected with the Gate line, the source thereof is connect with the Data line, and the drain thereof is connected with the first end of the second storage capacitor C2. The second end of the second storage capacitor C2 is connected with the Com line. The third storage capacitor C3 is a liquid crystal capacitor (C1c), that is, the equivalent capacitance of the liquid crystal as a capacitive material is usually about 0.7 pF. The third storage capacitor C3 is used for being turned on or down under the driving of the Gate line so as to control the turning on or down of the entire pixel. The second storage capacitor C2 is used for maintaining the display of the picture of the last frame in the procedure of switching between the pictures of two frames.

It is known from the above description that the above pixel driving circuit may not only realize the picture display function but also integrate the light touch function. Since the thin film transistor is employed to sense the light and the amplifier is used to perform the signal amplification process, the touch function of the driving circuit in the present embodiment has high touch sensitivity. In addition, since the light touch technique is employed, a display apparatus applying the driving circuit in the present embodiment is not limited by the screen size and is more applicable to the touch of a large size. Moreover, since the sensing signal by which a touch is conducted is generated by the irradiation of the light, the display apparatus applying the driving circuit in the present embodiment may not only be touched directly by a finger, but also be touched directly at a long distance by using a light emitting apparatus such as a laser pen, thus being more practical.

Second Embodiment

The present embodiment provides a driving method for a pixel driving circuit. The driving method is used for driving the pixel driving circuit as described in the first embodiment and includes a display driving procedure and a light touch driving procedure. The light touch driving procedure includes: sensing the intensity of the light and producing an electrical signal carrying the light intensity information; reading the electrical signal; acquiring the electrical signal and amplifying the electrical signal; acquiring the electrical signal amplified at a current time, obtaining the change amount of the electrical signal amplified at the current time relative to the electrical signal amplified at a previous time, comparing the change amount with a threshold of the change of the electrical signal, acquiring the position information of the pixel where the light touch module obtaining the change amount is located when the change amount is greater than the threshold of the electrical signal change, and taking the position information as the touch position.

In the above driving method, through the procedure of sensing the light→generating the electrical signal carrying the light intensity information→reading the electrical signal→amplifying the electrical signal→obtaining the change amount of the electrical signal→deciding whether there is a touch action→acquiring the touch position makes the apparatus realize the light touch on the basis of realizing the picture display.

It is noted that, the driving procedure as introduced above corresponds to the working procedure of the light touch module when scanning of one Gate line connected with the light touch module is driven within the time of one frame. In fact, exemplarily, there are multiple pixels including the light touch module and they are arranged in an array. Light touch modules of the same row are connected with the same Gate line, and light touch modules of the same column are connected with the same Data line. Within the time of one frame, by performing progressive scanning of multiple Gate lines connected with light touch modules, in the scan procedure of each Gate line, a Data line is used to read electrical signals carrying the light intensity information generated in respective light touch modules connected with the Gate line. After scanning of all the Gate lines connected with light touch modules is finished, the light touch scan within the time of one frame is completed.

In the present embodiment, when the Data line and the Read line are arranged in parallel, as shown in FIG. 2, within the time of one frame, the display driving procedure and the light touch driving procedure may exemplarily be performed at the same time. That is to say, procedure of using the Read line to read the electrical signal carrying the light intensity information generated by the photosensitive unit 201 and the procedure of using the Data line to apply a data voltage signal to the third thin film transistor T3 may be performed in parallel, and the two procedure do not interfere with each other, thus this driving method is simpler and more practicable.

When at least one of Data lines functions as the Read line, as shown in FIG. 3, within the time of one frame, the light touch driving procedure is performed after the display driving procedure is completed, alternatively, the display driving procedure is performed after the light touch driving procedure is completed. That is to say, in the light touch driving procedure, a Data line is reused as the Read line for reading the electrical signal carrying the light intensity information generated by the photosensitive unit 201. The display driving and the light touch driving are performed in sequence. This driving method is able to cause leads inside the driving circuit to be reduced, thus simplifying the structure of the driving circuit.

Third Embodiment

Figure 4:
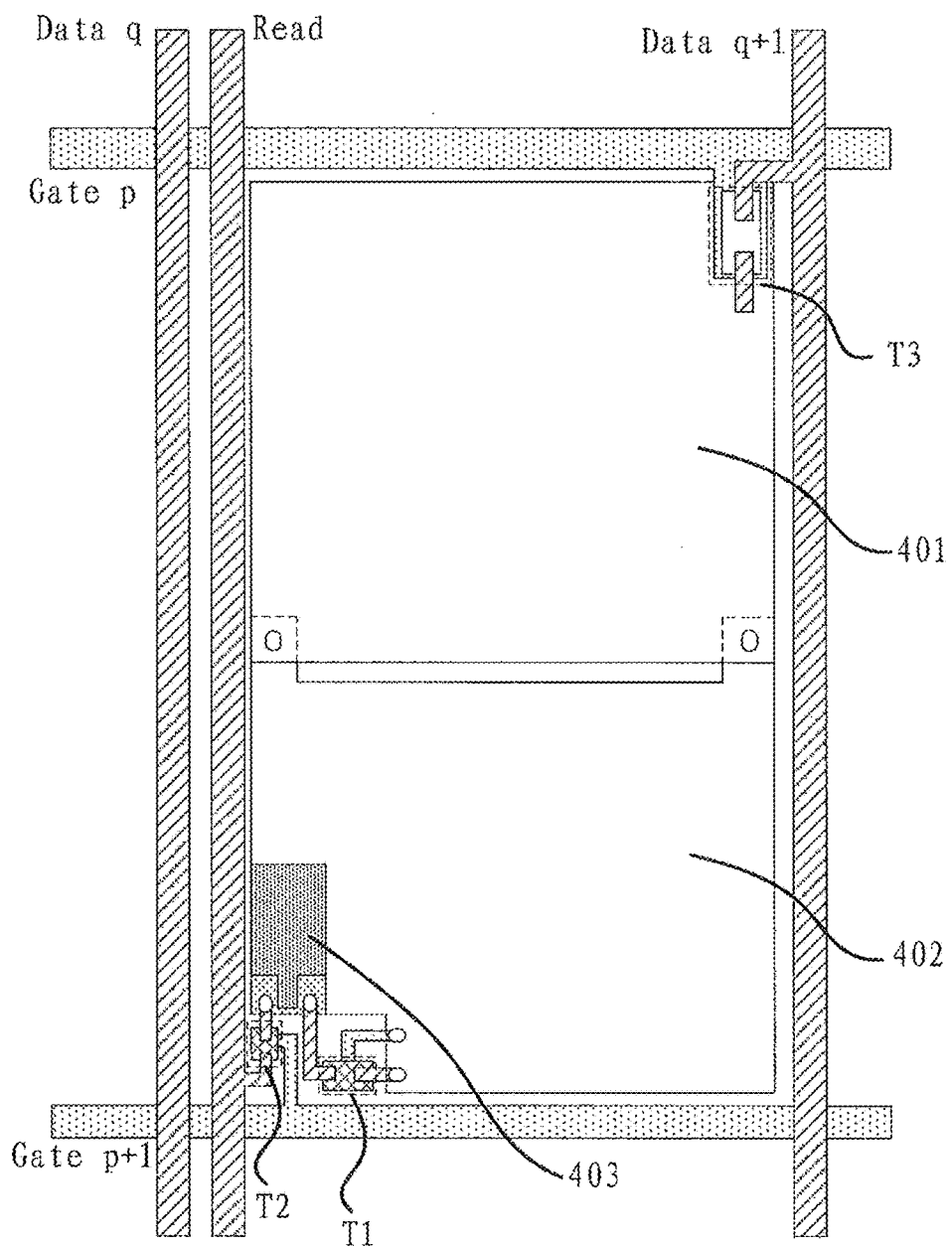
FIG. 4 is a flat top view of a single pixel of a light touch module included in an array substrate provided by a third embodiment of the present disclosure.
Figure 5:
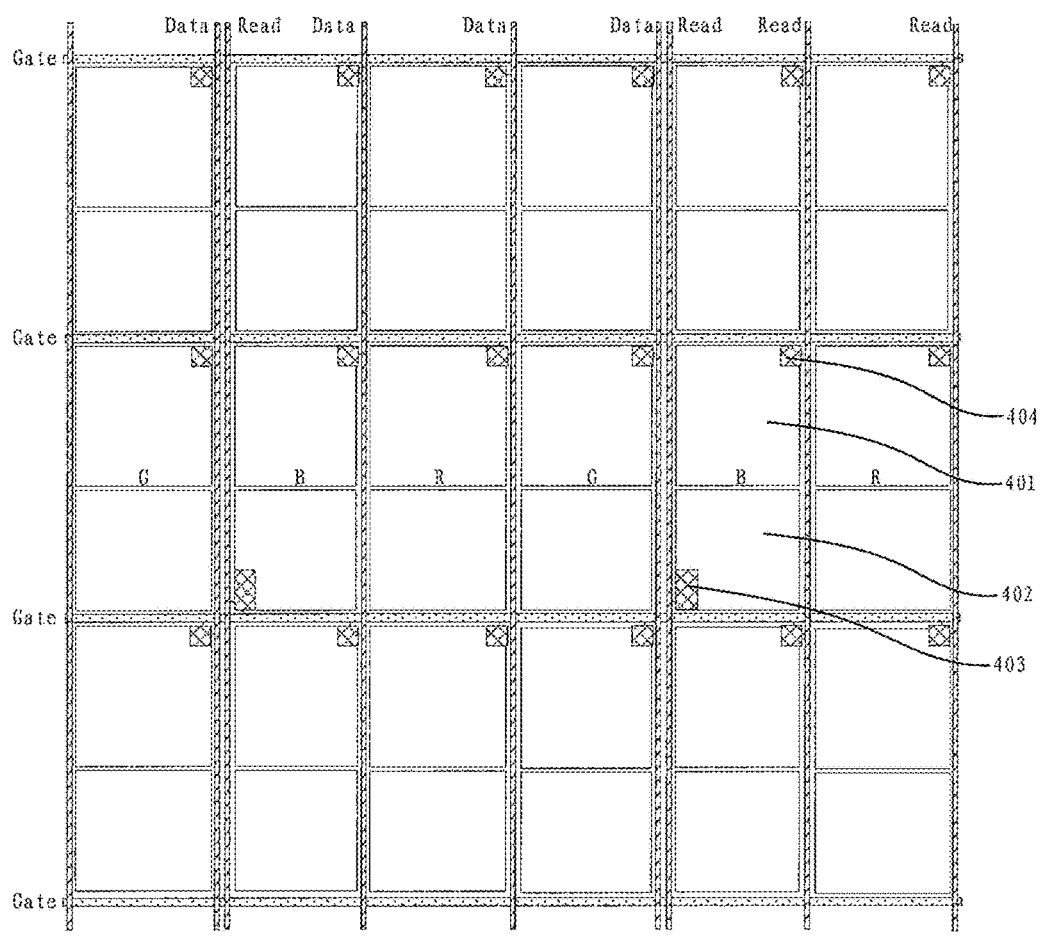
FIG. 5 is a flat top view of the array substrate provided by the third embodiment of the present disclosure.

The present embodiment provides an array substrate. As shown in FIGS. 4 and 5, the array substrate is a transflective array substrate and includes the pixel driving circuit as described in the first embodiment. Each pixel of the pixel driving circuit includes a transmissive region 401 and a reflective region 402 as well as a display driving module 404, and a reflection structure is provided in the reflective region 402.

In the above array substrate, the light emitted by a backlight module is able to transmitted through the transmissive region 401 from the back of the array substrate, and the ambient light can be reflected by the reflection structure in the reflective region 402, thus not only the light from the backlight module but also the ambient light can be effectively made use of, causing the display apparatus to save the energy consumption on basis of assuring a sufficient display brightness. In addition, the transflective array substrate can adjust the brightness of the picture display according to the brightness of the environment, and can be adaptive to different environments such as outdoor and indoor, so that using the display apparatus is more convenient and comfortable.

At the same time, since the included pixel driving circuit can not only realize the image display driving but also realize the light touch driving, the array substrate integrates functions of displaying and touch driving simultaneously.

In the present embodiment, alternatively, sizes of the transmissive region 401 and the reflective region 402 may be roughly identical. A transparent electrode which can function as the common electrode is provided in the transmissive region 401. The reflection structure provided in the reflective region 402 may alternatively be formed of a reflective metal.

The pixel driving circuit in the above array substrate may exemplarily include a common electrode line with which the reflection structure is connected with so as to function as the common electrode of the pixel.

In the present embodiment, all pixels included in the array substrate may be divided into two types: pixels including the light touch module and ordinary pixels (i.e. pixels not including the light touch module). A pixel including the light touch module may exemplarily include a first thin film transistor T1 and a first storage capacitor C1 with the reflection structure being a first plate of the first storage capacitor C1. A pixel of this type may further include a storage electrode 403 which has an overlapping part with the reflection structure, is connected with the drain of the first thin film transistor T1 and is a second plate of the first storage capacitor C1.

Since the reflection structure is connected with the Com line, the voltage of the reflection structure is at a Com voltage, and the storage electrode 403 is connected with the drain of the first thin film transistor T1, the voltage of the reflection structure is different from that of the storage electrode 403. There is an overlapping area between the reflection structure and the storage 403, and the two are spaced by a layer of insulating film, so that the reflection structure and the storage electrode 403 constitute the first storage capacitor C1 for storing the electrical signal carrying the light intensity information produced by the first thin film transistor T1 after being irradiated by the light.

In the present embodiment, the reflection structure may exemplarily be formed at the same layer with the gate of the thin film transistor in the array substrate, or be formed at the same layer with the source and the drain of the thin film transistor. The position of the storage electrode 403 may be adjusted according to varying in the position of the reflection structure, as long as the storage electrode 403 and the reflection structure is spaced by a certain layer of insulating film. Alternatively, the storage electrode 403 may be located above the reflection structure.

The storage electrode 403 is preferably a layer of transparent film so that the incident ambient light from the front of the array substrate can pass through the storage electrode 403, reach the reflection structure and then be reflected by the reflection structure. Further, the storage electrode 403 may be formed at the same layer with the pixel electrode.

The transflective array substrate provided in the present embodiment may further include a one-fourth-wavelength phase delay slice provided in the reflective region, for making the optical distance of the light passing through the transmissive region and the reflective region is equal, thus assuring the normal display of the picture.

It is noted that the above description is based on an ADS (Advanced Super Dimension Switch) array substrate with both the pixel electrode and the common electrode being located on the array substrate and the common electrode being located below the pixel electrode. In other embodiments of the present disclosure, the array substrate may also be an array substrate of types such as TN (Twisted Nematic), MVA (Multi-domain Vertical Alignment), PVA (Patterned Vertical Alignment), IPS (In-Plane Switching), FFS (Fringe Field Switching) and so on.

In the array substrate provided in the present embodiment, the pixel may exemplarily be a red (R) pixel, a green (G) pixel or a blue (B) pixel. Since the light transmittance of a blue pixel is higher than that of a red pixel and a green pixel, the pixel including the light touch module may exemplarily be made a blue pixel, that is, the light touch module is provided in a blue pixel so as to reduce the influence of providing the light touch module on the aperture ratio and the light transmittance of the pixel as much as possible, thus improving the uniformity in the brightness of pixels of all kinds of colors.

In addition, according to varying in the material of which the active layer of the thin film transistor is formed, the array substrate in the present embodiment may exemplarily be of types such as LTPS (Low Temperature Poly-Silicon), amorphous silicon (a-Si: H), HTPS (High Temperature Poly-Silicon), oxide semiconductor and so on.

Fourth Embodiment

The present embodiment provides a transflective display apparatus including the array substrate as described in the third embodiment. Based on the statement of advantages of the array substrate in the third embodiment, the transflective display apparatus in the present embodiment has many advantages of a high display brightness, a lower energy consumption, being capable of adjusting the brightness according to the ambient brightness, being adaptive to different environments such as outdoor and indoor, being used more conveniently and comfortably, integrating dual functions of display and touch, being able to realizing the touch by a finger and the remote light touch, being more applicable to realization of a large size and so on.

It is noted that the transflective display apparatus in the present embodiment may be any product or component having a display function, such as a liquid crystal panel, an electronic paper, an OLED (Organic Light-Emitting Diode) panel, a cellphone, a tablet computer, a TV set, a display, a notebook computer, a digital photo frame, a navigator and so on.

The described above is only specific embodiments of the present disclosure, but the protection scope of the present disclosure is not limited thereto. The change or replacement which can be thought out easily by those skilled in the art within the scope of techniques disclosed by the present disclosure should all be covered by the protection scope of the present disclosure. Thus, the protection scope of the present disclosure should be decided by the protection scope of claims.

The present application claims the priority of a Chinese patent application No. 201410357298.1 submitted on Jul. 24, 2014, the full content disclosed by which is referenced hereby as a part of the present application.

What is claimed is:

1. A pixel driving circuit, comprising: a plurality of pixels arranged in a matrix, each pixel of the pixel driving circuit comprising a transmissive region and a reflective region in which a reflection structure for reflecting the light is provided; gate lines located between two adjacent rows of the pixels, at least one of the pixels comprising a light touch module which comprises:
   a photosensitive unit which senses the light intensity and produces an electrical signal carrying the light intensity information;
   a signal reading unit connected with the photosensitive unit, the signal reading unit being controlled by the gate lines, being turned on under the driving of the gate lines, and reading the electrical signal from the photosensitive unit;
   an amplifier connected with the signal reading unit, the amplifier acquiring the electrical signal from the signal reading unit and amplifying the electrical signal;
   a processor connected with the amplifier, the processor being configured to acquire the electrical signal amplified at the current frame from the amplifier, subtract the electrical signal amplified at the current frame from the electrical signal amplified at a previous frame to obtain the change amount of the electrical signal at the current frame relative to the electrical signal at the previous frame, compare the change amount with a threshold of the change of the electrical signal, determine that a touch action occurs and acquire the position information of the pixel where the light touch module is located when the change amount is greater than the threshold of the electrical signal change, and take the position information as the touch position, the threshold of the change of the electrical signal and the electrical signal amplified at the previous frame being stored in the processor,
   wherein, the pixel driving circuit further comprises a common electrode line with which the reflection structure is connected;
   the pixel comprising the light touch module of the pixel driving circuit comprises a first thin film transistor and a first storage capacitor with the reflection structure being a first plate of the first storage capacitor;
   the pixel comprising the light touch module of the pixel driving circuit further comprises a storage electrode which has an overlapping part with the reflection structure, is connected with the drain of the first thin film transistor and is a second plate of the first storage capacitor,
   the storage electrode is located above the reflection structure, and the storage electrode is a transparent electrode so that the incident light can pass through the storage electrode, reach the reflection structure.

2. The pixel driving circuit according to claim 1, further comprising: a common electrode line by which the photosensitive unit is controlled.

3. The pixel driving circuit according to claim 2, wherein the photosensitive unit comprises:
   the first thin film transistor, the gate of which is connected with the common electrode line, the source of which is connected with the common electrode line, and the drain of which is connected with the signal reading unit;
   the first storage capacitor, the first end of which is connected with the source of the first thin film transistor and the second end of which is connected with the drain of the thin film transistor.

4. The pixel driving circuit according to claim 1, further comprising: a signal reading line through which the signal reading unit is connected with the amplifier.

5. The pixel driving circuit according to claim 4, wherein the pixel driving circuit comprises data lines located between two adjacent columns of the pixels, the data lines and the signal reading line being arranged in parallel, or at least one of the data lines functioning as the signal reading line.

6. The pixel driving circuit according to claim 5, wherein the pixel driving circuit is configured to further, when at least one of the data lines functions as the signal reading line, comprise:
   a switch located between the signal reading unit and the amplifier, the switch being configured to be turned on only when the light touch module is working.

7. The pixel driving circuit according to claim 4, wherein the signal reading unit comprises:
   a second thin film transistor, the gate of which is connected with the gate lines, the source of which is connected with the photosensitive unit, and the drain of which is connected with the signal reading line.

8. The pixel driving circuit according to claim 1, wherein the numbers of the gate lines are a first gate line, a second gate line, . . . , a M-th gate line in order, the pixel driving circuit comprises data lines located between two adjacent columns of the pixels, the numbers of the data lines are a first data line, a second data line, . . . , a N-th data line in order, and the position information of the pixel where the light touch module is located includes the numbers of the gate line and the data line which are connected with the pixel where the light touch module is located.

9. The system according to claim 1, wherein pixels including the light touch module are distributed evenly or unevenly in the pixel driving circuit.

10. A driving method for a pixel driving circuit, for driving the pixel driving circuit according to claim 1, the driving method comprising a display driving procedure and a light touch driving procedure, wherein the light touch driving procedure comprises:

sensing the light intensity and producing an electrical signal carrying the light intensity information;

reading the electrical signal;

acquiring the electrical signal and amplifying the electrical signal;

acquiring the electrical signal amplified at a current frame, subtracting the electrical signal amplified at the current frame from the electrical signal amplified at a previous frame to obtain the change amount of the electrical signal at the current frame relative to the electrical signal at the previous frame, comparing the change amount with a threshold of the change of the electrical signal, determining that a touch action occurs and acquiring the position information of the pixel where the light touch module obtaining the change amount is located when the change amount is greater than the threshold of the electrical signal change, and taking the position information as the touch position.

11. The driving method for the pixel driving circuit according to claim 10, wherein, when the data lines and the signal reading line are arranged in parallel, the display driving procedure and the light touch driving procedure are performed simultaneously within the time of one frame.

12. The driving method for the pixel driving circuit according to claim 10, wherein, when at least one of the data lines functions as the signal reading line, within the time of one frame, the light touch driving procedure is performed after the display driving procedure is completed, or the display driving procedure is performed after the light touch driving procedure is completed.

13. An array substrate comprising the pixel driving circuit according to claim 1, each pixel of the pixel driving circuit comprising a transmissive region and a reflective region in which a reflection structure for reflecting the light is provided, wherein, the pixel driving circuit further comprises a common electrode line with which the reflection structure is connected;

the pixel comprising the light touch module of the pixel driving circuit comprises a first thin film transistor and a first storage capacitor with the reflection structure being a first plate of the first storage capacitor;

the pixel comprising the light touch module of the pixel driving circuit further comprises a storage electrode which has an overlapping part with the reflection structure, is connected with the drain of the first thin film transistor and is a second plate of the first storage capacitor.

14. The array substrate according to claim 13, wherein, the storage electrode is located above the reflection structure.

15. The array substrate according to claim 13, wherein, the pixel is a red pixel, a green pixel or a blue pixel, and the pixel comprising the light touch module of the pixel driving circuit is a blue pixel.

16. A transflective display apparatus comprising the array substrate according to claim 13.

17. The transflective display apparatus according to claim 16, wherein, the pixel driving circuit further comprises a common electrode line with which the reflection structure is connected;

the pixel comprising the light touch module of the pixel driving circuit comprises a first thin film transistor and a first storage capacitor with the reflection structure being a first plate of the first storage capacitor;

the pixel comprising the light touch module of the pixel driving circuit further comprises a storage electrode which has an overlapping part with the reflection structure, is connected with the drain of the first thin film transistor and is a second plate of the first storage capacitor.

18. The transflective display apparatus according to claim 16, wherein, the pixel is a red pixel, a green pixel or a blue pixel, and the pixel comprising the light touch module of the pixel driving circuit is a blue pixel.

* * * * *